United States Patent
Zavracky et al.

(10) Patent No.: US 6,202,495 B1
(45) Date of Patent: Mar. 20, 2001

(54) FLOW, TACTILE AND ORIENTATION SENSORS USING DEFORMABLE MICROELECTRICAL MECHANICAL SENSORS

(75) Inventors: Paul M. Zavracky, Norwood; Nicol E. McGruer, Dover, both of MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 09/207,280

(22) Filed: Dec. 8, 1998

(Under 37 CFR 1.47)

Related U.S. Application Data

(60) Provisional application No. 60/069,009, filed on Dec. 10, 1997.

(51) Int. Cl.⁷ .................................................. G01L 1/04
(52) U.S. Cl. ........................................ 73/862.639; 73/777
(58) Field of Search ................... 73/777, 780, 862.635, 73/862.639

(56) References Cited

U.S. PATENT DOCUMENTS

| | | | |
|---|---|---|---|
| 5,397,904 | * | 3/1995 | Arney et al. ............................ 257/66 |
| 5,490,034 | * | 2/1996 | Zavracky et al. .................. 361/283.4 |
| 5,526,703 | * | 6/1996 | Aslam et al. ...................... 73/862.68 |
| 5,880,921 | * | 3/1999 | Tham et al. .......................... 361/233 |

* cited by examiner

*Primary Examiner*—Max Noori
(74) *Attorney, Agent, or Firm*—Weingarten, Schurgin, Gagnebin & Hayes LLP

(57) ABSTRACT

A microelectric flow sensor including a deformable mechanical element is disclosed. The sensor includes a beam element mounted to a substrate. The beam element is anchored to the substrate on a first end, and deformed to a position normal to the surface of the substrate. An electrode is positioned on the substrate below a portion of the beam, such that when the beam is deflected, an electrical connection is established between the beam and the electrode.

An alternate flow sensor includes a sensing beam surrounded by at least two cantilever beams which act as switches. The sensing beam is defined with two mechanically weak points which allow the sensing beam to be mechanically deformed to a new position approximately perpendicular to the cantilever beams and the top surface of the substrate. The substrate also includes electrodes which are positioned underneath the ends of the cantilever beams. With the sensing beam perpendicular to the surface, forces applied to the sensing beam will cause the beam to deflect. Because the cantilever beams are mechanically connected to the sensing beam the cantilever beams are bent towards a substrate upon deflection of the sensing beam. The flow sensor may be configured to function as a tilt sensor by attaching a weight proximate the end of the sensing beam. The flow sensor can be further modified to perform in harsh environments by including a diaphragm surrounding the cantilever beams and electrodes, with the sensing beam extending therethrough.

22 Claims, 5 Drawing Sheets

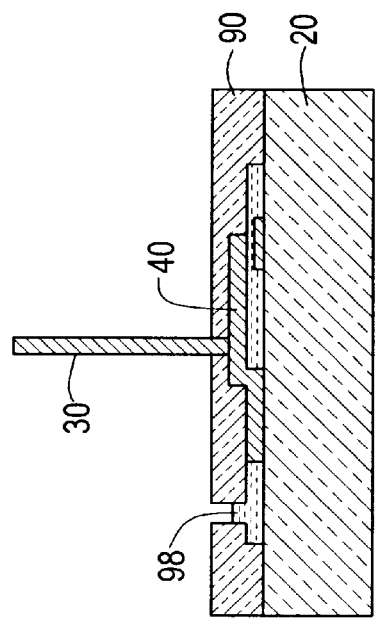
FIG. 12A
FIG. 12B
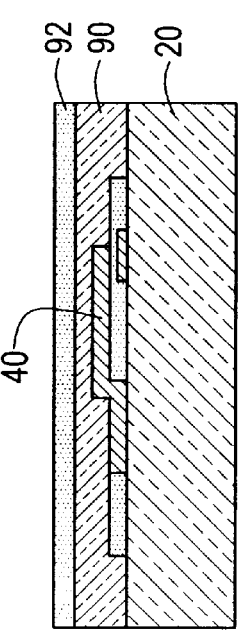
FIG. 12C
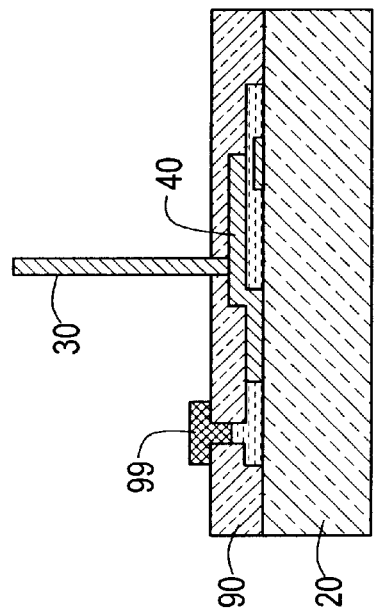
FIG. 12D
FIG. 12E

FLOW, TACTILE AND ORIENTATION SENSORS USING DEFORMABLE MICROELECTRICAL MECHANICAL SENSORS

CROSS REFERENCE TO RELATED APPLICATIONS

This application claims priority under 35 U.S.C. §119(e) to Provisional Patent Application serial No. 60/069,009 filed Dec. 10, 1997; the disclosure of which is incorporated by reference herein.

STATEMENT REGARDING FEDERALLY SPONSORED RESEARCH OR DEVELOPMENT

Not Applicable

BACKGROUND OF THE INVENTION

Flow sensors and tilt sensors are known in the art, and are used in a wide variety of applications. The sensors tend to be bulky, expensive and take up valuable space within the settings they are used in. It would be desirable to have a flow or tilt sensor which is small in size, easy to manufacture and use while being more cost effective. It would further be desirable to have such a sensor which is also useable in harsh environments.

BRIEF SUMMARY OF THE INVENTION

A microelectric flow sensor including a deformable mechanical element is disclosed. The sensor includes a beam element mounted to a substrate. The beam element is anchored to the substrate on a first end, and deformed to a position normal to the surface of the substrate. An electrode is positioned on the substrate below a portion of the beam, such that when the beam is deflected, an electrical connection is established between the beam and the electrode.

Further embodiments include a beam element which includes a sensing beam surrounded by at least two cantilever beams which act as switches. The sensing beam is defined with two mechanically weak points which allow the sensing beam to be mechanically deformed to a new position approximately perpendicular to the cantilever beams and the top surface of the substrate. The substrate also includes electrodes which are positioned underneath the ends of the cantilever beams. With the sensing beam perpendicular to the surface, forces applied to the sensing beam will cause the beam to deflect. Because the cantilever beams are mechanically connected to the sensing beam the cantilever beams are bent towards a substrate upon deflection of the sensing beam. Eventually, the cantilever beams switch contacts will contact the electrodes on the substrate creating a short circuit between the electrodes. Accordingly, the microelectric sensor provides an "on" or "off" signal dependent upon the force of the flow on the sensing beam. The flow threshold that is detected by the sensor is directly proportional to the stiffness and length of the beams.

In one embodiment the beam element of the sensor is formed having a plurality of cantilever beams of various lengths. The longer cantilever beams will be more sensitive since a smaller deflection by the sensing beam is required to produce an electrical connection between pairs of electrodes associated with the longer cantilever beams. Alternatively, a beam element including a single cantilever beam with multiple contacts and associated electrodes could be utilized to accomplish the same function.

The flow sensor may be configured to function as a tilt sensor by attaching a weight proximate the end of the sensing beam. In the single beam embodiment, tilting the beam beyond a certain angle causes the weight to deflect the beam into a position wherein the beam is in electrical communication with the electrode. In the multiple beam embodiments, tilting of the sensor beyond a certain angle will cause the weight to deflect the sensing beam, which produces a concomitant deflection of the cantilever beams such that the cantilever beams contact the associated electrodes on the substrate. The tilt sensor can be made to sense various angles by changing the original angle to which the beam is bent. Further, by orienting several sensing beams at different angles on the substrate, tilt measurements on a solid angle are possible.

The flow sensor can be further modified to perform in harsh environments by including a diaphragm surrounding the cantilever beams and electrodes, with the sensing beam extending therethrough. The area surrounding the cantilever beams and electrodes which is defined by the diaphragm may be filled with a nonconductive liquid, a gas or be evacuated before being sealed. With such an embodiment, only the sensing beam is exposed to the environment, while the cantilever beams and associated electrodes are insulated from the environment.

BRIEF DESCRIPTION OF THE SEVERAL VIEWS OF THE DRAWING

The invention will be more fully understood from the following detailed description taken in conjunction with the accompanying drawings in which:

FIG. 12A is a cross-sectional side view of the environmentally protected sensor after a fifth step of the fabrication process;

FIG. 12B is a cross-sectional side view of the environmentally protected sensor after a sixth step of the fabrication process;

FIG. 12C is a cross-sectional side view of the environmentally protected sensor after a seventh step of the fabrication process;

FIG. 12D is a cross-sectional side view of the environmentally protected sensor after a eighth step of the fabrication process; and FIG. 12E is a cross-sectional side view of the environmentally protected sensor after a ninth step of the fabrication process.

DETAILED DESCRIPTION OF THE INVENTION

Figure 1:
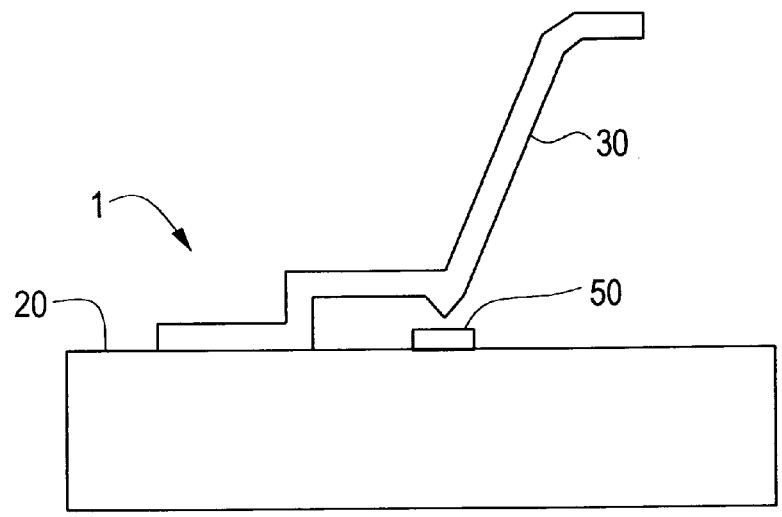
FIG. 1 is a side view of a first embodiment of a flow sensor.
Figure 2A:
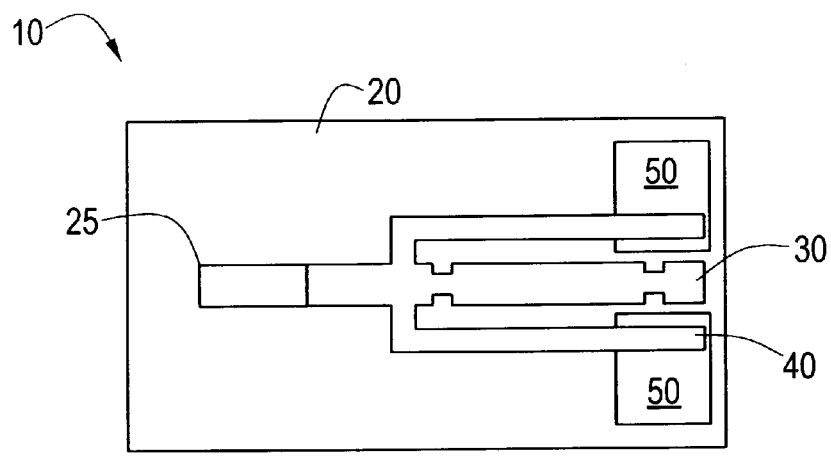
FIG. 2A is a top view of a flow sensor of a further embodiment before the sensing beam is mechanically deformed.
Figure 2B:
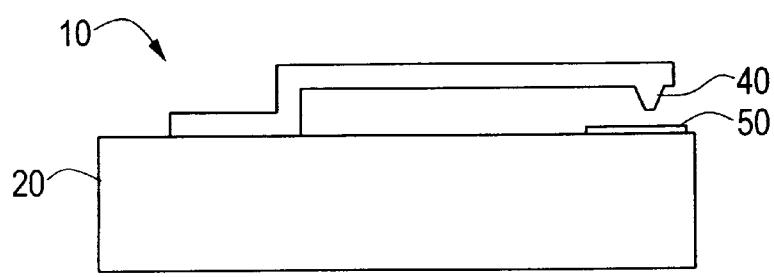
FIG. 2B is a side view of the flow sensor of FIG. 2A.
Figure 3:
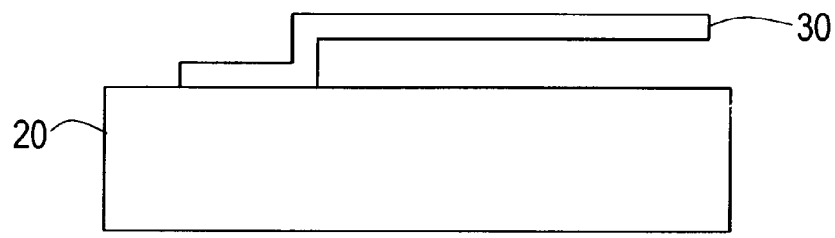
FIG. 3 is a side view of the cantilever beam of the sensor of FIG. 2A.
Figure 4:
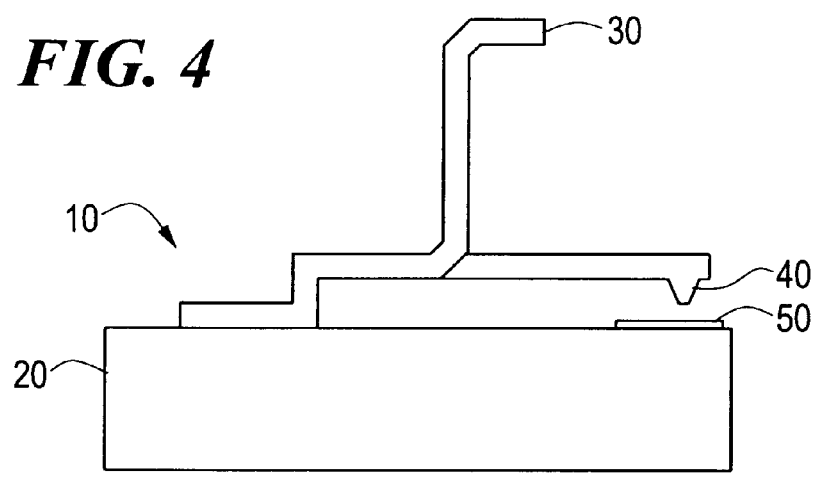
FIG. 4 is a side view of the sensor of FIG. 2A after the sensing beam has been deformed.
Figure 5:
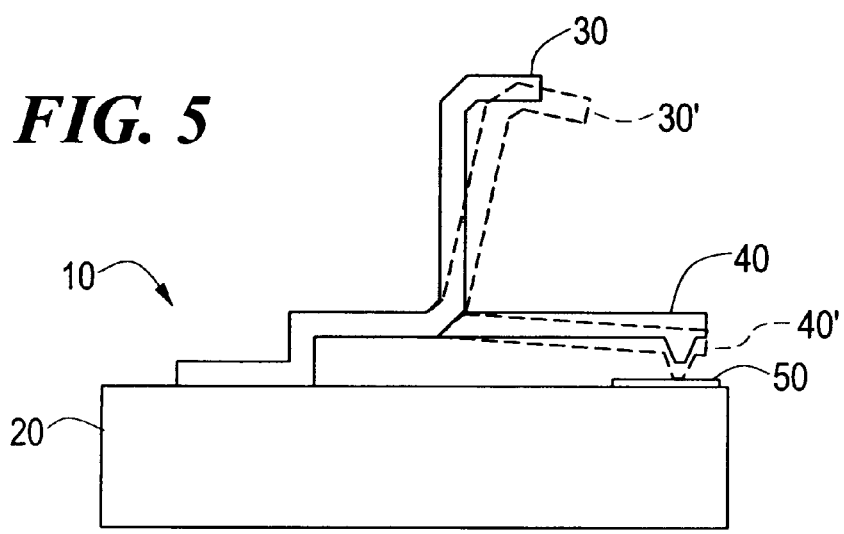
FIG. 5 is a side view of the sensor of FIG. 3 showing the first and second positions of the beams.

Referring to FIG. 1, a microelectric flow sensor 1 including a deformable mechanical element is presented. The sensor 10 includes a beam element comprising a sensor beam 30 which is mechanically deformed to a position generally perpendicular to the surface of the substrate. An electrode 50 is disposed beneath a portion of the beam 30 such that when the sensing beam is displaced by sensing a flow above a predetermined threshold, a connection is made between the sensing beam 30 and the electrode 50. Since the beam is comprised of a conductive material such as nickel, gold, ruthenium, platinum or combinations thereof and most preferably nickel-gold or ruthenium, an electrical communication path is established between the beam 30 and the substrate electrode 50. Accordingly, the sensor 1 provides an "on" or "off" signal dependent upon the force of the flow on the sensing beam 30. The flow threshold that is detected by the sensor is directly proportional to the stiffness and length of the beam, Referring now to FIGS. 2A–5, a further embodiment of a sensor 10 is shown wherein a sensing beam 30 is surrounded by at least two cantilever beams 40 which act as switch elements. The beams 30 and 40 may be integral or formed separately and mechanically coupled to one another. One end of the beam element 25 is attached to a substrate 20, while the opposite ends of the cantilever beams 40 are suspended above substrate electrodes 50. The sensing beam 30 is displaced out of plane with the cantilever beams, as is best shown in FIG. 3. As shown in FIG. 5, the sensing beam 30 is movable between a first position of the beam 30, to a second position of the beam 30'. As a result of sensing beam 30 being deflected from the first position to the second position, the cantilever beams are also movable from a first position of the beams 40 to a second position of the beams 40'.

With the sensing beam 30 perpendicular to the surface, forces applied to the sensing beam 30 will cause the beam to deflect. Because the cantilever beams 40 are mechanically connected to the sensing beam 30 the cantilever beams 40 are bent towards the substrate 20 upon deflection of the sensing beam 30. Eventually, the cantilever beams 40 switch contacts will contact the electrodes 50 on the substrate 20 creating a short circuit between the electrodes 50. Accordingly, the sensor 10 provides an "on" or "off" signal dependent upon the force of the flow on the sensing beam 30. The flow threshold that is detected by the sensor is directly proportional to the stiffness and length of the beams 30 and 40.

Figure 6:
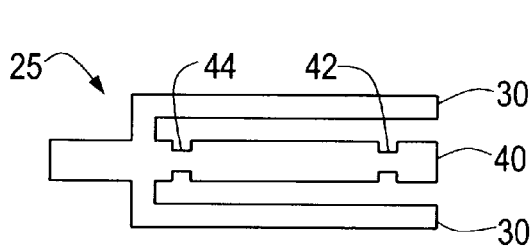
FIG. 6 is a top view of a second beam element embodiment.

Referring now to FIG. 6, the beam element 25 is shown and includes the sensing beam 40 and cantilever beams 30. Also shown is a reduced area 42 and 44 as part of sensing beam 40. The reduced area is utilized such that when sensing beam 40 is mechanically deformed to a non-planar position with respect to cantilever beams 30, the sensing beam is deformed at the reduced areas 40 and 42.

Figure 7:
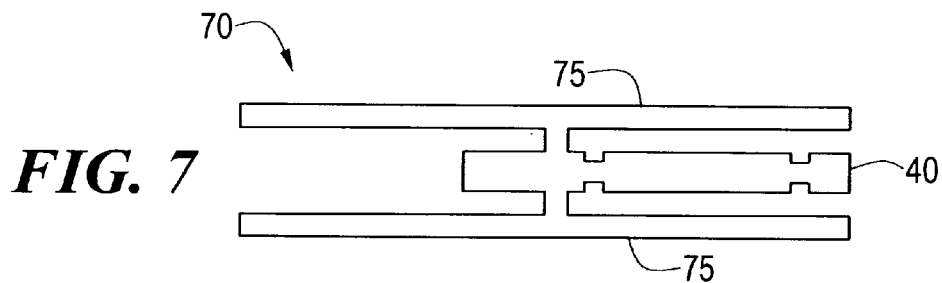
FIG. 7 is a top view of a third beam element embodiment.

Referring now to FIG. 7, an alternate embodiment of a beam element 70 is shown. In this embodiment the sensing beam 40 is similar to that of the sensing beam 40 shown in FIG. 6, however the cantilever beams are shown extending beyond the area where the beams couple. With such a configuration, deflection of the sensing beam 40 in two directions can be detected. Accordingly, with this embodiment a bidirectional flow can be sensed.

Figure 8:
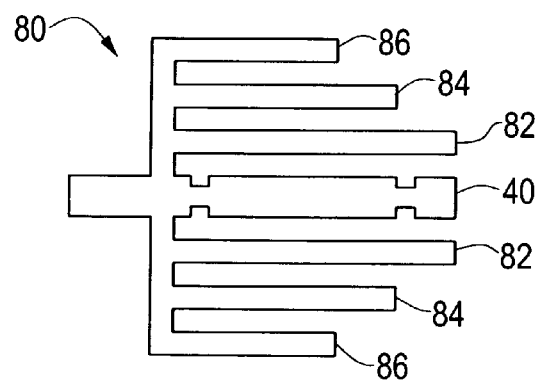
FIG. 8 is a top view of a fourth beam element embodiment.

A further embodiment of the beam element 80 is shown in FIG. 8. In this embodiment the sensing beam 40 is similar to that of the sensing beam 40 shown in FIG. 6, however a plurality of different length cantilever beams 82, 84, and 86 are shown. The longer cantilever beams 82 will be more sensitive to detection of a flow since a smaller deflection by the sensing beam 40 is required to produce an electrical connection between the longer cantilever beams and their associated electrodes. Further, by way of the different length beams flow forces of different magnitudes can be detected. Sensing beam 40 and first cantilever beams 82 detect a first pressure, sensing beam 40 and second cantilever beams 84 detect a second pressure which is greater than the first pressure, and sensing beam 40 and third cantilever beams 86 detect a third pressure which is greater than the first pressure and the second pressure. By use of multiple different length cantilever beams, a variety of pressures may be sensed. Alternatively, a single beam with multiple contacts and associated electrodes could be provided to accomplish a similar function.

Figure 9:
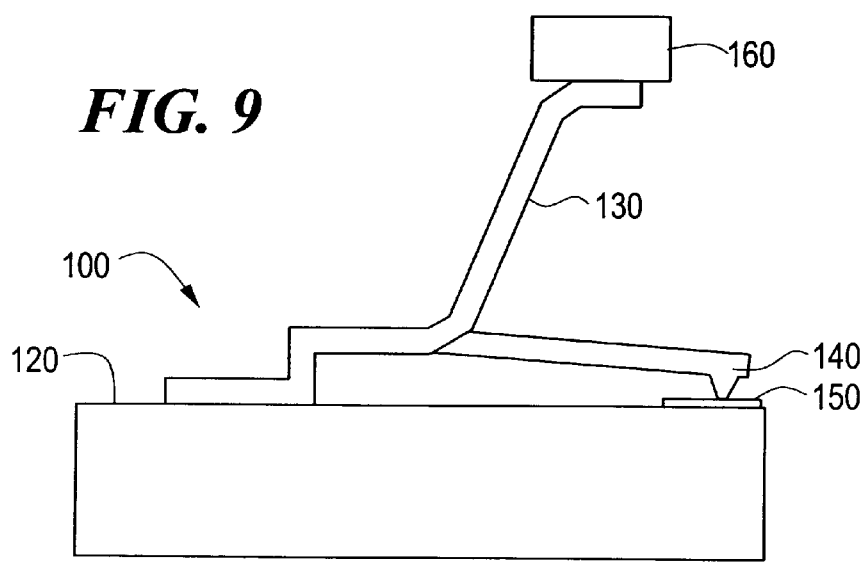
FIG. 9 is a side view of a tilt sensor.

Referring now to FIG. 9, the sensor can be utilized as a tilt sensor 100 by including a weight 160 at a distal end of sensing beam 130. The tilt sensor 100 is otherwise similar to the previously described flow sensor, and may further include a cantilever beam 140 mechanically coupled to the sensing beam 130, with an end of the beams mounted to a substrate 120. The free ends of the cantilever beams 140 are positioned a predetermined distance above an electrode 150. Upon tilt sensor 100 being tilted more than a predetermined angle, the weight 160 causes the sensing beam 130 to deflect towards substrate 120. Since cantilever beams 140 are mechanically coupled to sensing beam 130, the cantilever beams will deflect and provide an electrical communication path between electrodes 150. The tilt sensor 100 can be made to sense various angles by changing the original angle to which the sensing beam 130 is bent. Further, by orienting several beams at different angles on the substrate, tilt measurements on a solid angle are possible.

Figure 10:
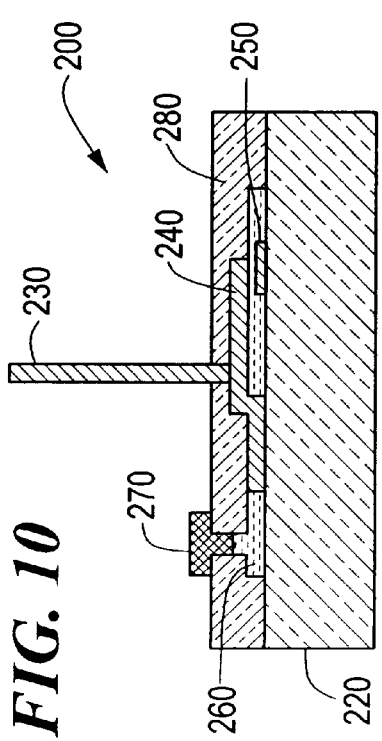
FIG. 10 is a cross-sectional side view of an environmentally protected sensor.

An environmentally protected embodiment of the flow sensor 200 is shown in FIG. 10. In this embodiment the sensor is similar to the sensor 10 shown in FIG. 5, and further includes a diaphragm 280 surrounding the cantilever beams 240, electrode 250 and a portion of sensing beam 230. The area surrounding the cantilever beams and electrodes which is defined by the diaphragm 280 may be filled with a nonconductive liquid, filled with a gas or be evacuated before being sealed by plug 270.

Figure 11C:
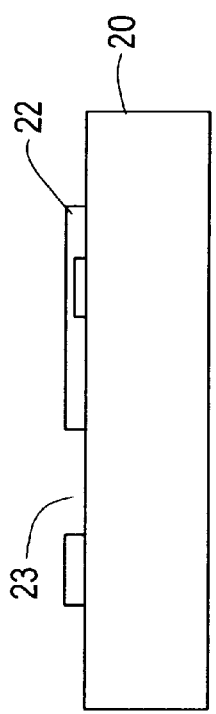
FIG. 11C is a side view of the sensor after a third step of the fabrication process.
Figure 11D:
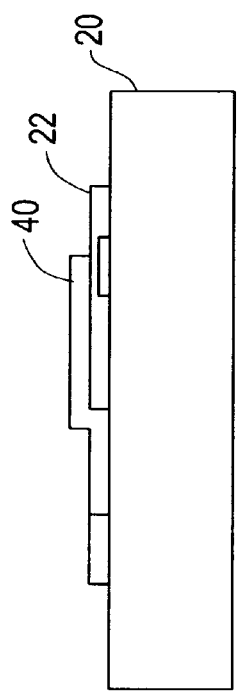
FIG. 11D is a side view of the sensor after a fourth step of the fabrication process.
Figure 11E:
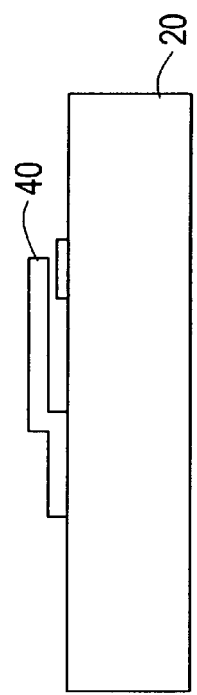
FIG. 11E is a side view of the sensor after a fifth step of the fabrication process.
Figure 11A:
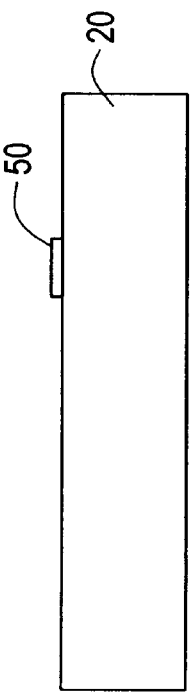
FIG. 11A is a side view of the sensor after the first step of the fabrication process.

Referring now to FIGS. 11A–E, the method for producing the sensor is shown. As shown in FIG. 11A the first step comprises depositing an electrode 50 on a substrate 20. The substrate material may be glass, silicon, sapphire or other substrate material known in the arts. The electrode 50 is preferably comprised of chrome-gold while other conductive materials such as platinum, rhodium, ruthenium and combinations thereof may also be used.

Figure 11B:
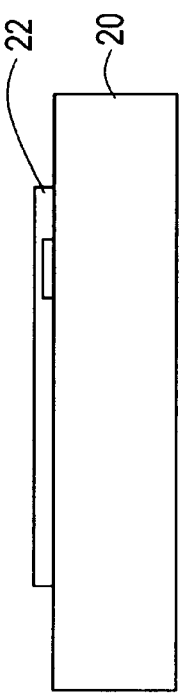
FIG. 11B is a side view of the sensor after the second step of the fabrication process.

As shown in FIG. 11B, a first sacrificial layer 22 is deposited over electrode 50 and at least a portion of substrate 20. The sacrificial layer 22 could be an organic material, such as photoresist or polysilicon, or a metal such as aluminum, copper or nickel.

The following step, shown in FIG. 11C, shows the patterning of the first sacrificial layer 22. A portion 23 of the sacrificial layer has been removed to provide an area for attaching one end of the beam element to the substrate 20.

Referring now to FIG. 11D, the beam element which includes the cantilever beams and the sensing beam is deposited such that one end of the beam element is attached to the substrate 20, while the opposing ends of the cantilever beams are deposited over the electrodes 50, separated by the sacrificial layer 22. The beam element is deposited by electroless plating, electroplating or other technique that which may be patterned by liftoff or chemical etching.

The final step is shown in FIG. 11E and results in the sacrificial layer being removed by etching or dissolving chemically. Etchants may include water, hydrogen peroxide, ammonium hydroxide or other compound that is capable of dissolving the sacrificial layer. Preferably, the etchant is chosen to dissolve the sacrificial layers and not the metals forming the beam and electrodes.

The method of making the environmentally protected sensor is similar to the previously described method with the differences shown in FIGS. 12A–E. The first steps of the method are similar to steps shown in FIGS. 11A–D, and as such will not be described again. Starting from FIG. 11D, a diaphragm 90 is deposited which surrounds the beam 40, electrode 50 and first sacrificial layer 22. A second sacrificial layer 92 is deposited on the diaphragm 90. The diaphragm is comprised of a polymer material.

As shown in FIG. 12B the second sacrificial layer and the diaphragm are patterned. Specifically, the second sacrificial layer and the diaphragm are etched to provide an access area to the beam 40 and to provide an access area to the first sacrificial layer. Sensing beam 30 is deposited over second sacrificial layer 92 and is mechanically coupled to cantilever beams 40.

At the next step, shown in FIG. 12C, the second sacrificial layer is etched away, freeing a distal end of sensing beam 30 and at least a portion of the first sacrificial layer is etched away.

As shown in FIG. 12D, the sensing beam 30 is mechanically deformed to a position wherein the sensing beam 30 is generally perpendicular with respect to cantilever beams 40 and the area where the first sacrificial layer was is either evacuated; filled with a liquid such as silicone oils, organic fluids or water; or filled with a gas such as argon or nitrogen.

The final step, illustrated in FIG. 12E, illustrates the access hole being plugged such as by an epoxy drop to seal in a liquid, or by depositing a film to seal in a vacuum or a gas. As a result, the sensor can be used in harsh environments, for example an ocean, with only a portion of the sensing beam exposed to the harsh environment while the cantilever beams 40 and electrode 50 are isolated from the external environment.

Having described preferred embodiments of the invention it will now become apparent to those of ordinary skill in the art that other embodiments incorporating these concepts may be used. Accordingly, it is submitted that the invention should not be limited to the described embodiment but rather should be limited only by the spirit and scope of the appended claims.

We claim:

1. A microelectrical mechanical sensor comprising:
   a substrate, of a first material, having an electrode, of a second material different from said first material, disposed thereon;
   a sensing beam, of a third material, having a first end and a second end, the first end of said sensing beam attached to said substrate, said sensing beam including a first switch contact, said sensing beam disposed generally non-parallel with respect to a top surface of said substrate, said sensing beam movable between a first position wherein said first switch contact is isolated from said electrode to a second position wherein said first switch contact is in electrical communication with said electrode.

2. The sensor of claim 1 wherein said sensing beam includes at least one area having weakened strength such that said beam is adapted to deform at said at least one weakened strength area.

3. The sensor of claim 1 wherein said sensing beam is deformed generally perpendicular with respect to a top surface of said substrate.

4. The sensor of claim 1 further comprising a weight disposed on said second end of said sensing beam.

5. The sensor of claim 1 wherein said beam is comprised of a material selected from the group consisting of nickel, gold, ruthenium, platinum or combinations thereof.

6. The sensor of claim 1 wherein said electrode is comprised of a material selected from the group consisting of chrome, gold, platinum, rhodium, ruthenium and combinations thereof.

7. The sensor of claim 1 wherein said substrate is comprised of a material selected from the group consisting of glass, silicon or sapphire.

8. A microelectrical mechanical sensor comprising:
   a substrate, of a first material, having an electrode, of a second material different from said first material, disposed thereon;
   at least one cantilever beam having a first end and a second end, the second end including a first switch contact, the second end and the first switch contact spaced a predetermined distance above said electrode, said at least one cantilever beam substantially parallel to said substrate; and
   a sensing beam, of a third material, having a first end and a second end, the first end of said sensing beam attached to said substrate, said sensing beam mechanically coupled to said at least one cantilever beam, said sensing beam disposed generally non-parallel with respect to said substrate, said sensing beam and said at least one cantilever beam movable between a first position wherein said first switch contact is isolated from said electrode to a second position wherein said first switch contact is in electrical communication with said electrode.

9. The sensor of claim 8 wherein said sensing beam includes at least one area having weakened strength such that said beam is adapted to deform at said at least one weakened strength area.

10. The sensor of claim 8 wherein said sensing beam is deformed generally perpendicular with respect to said at least one cantilever beam.

11. The sensor of claim 8 wherein said at least one cantilever beam comprises a plurality of cantilever beams, at least two of which have approximately the same length.

12. The sensor of claim 8 wherein said at least one cantilever beam comprises a plurality of cantilever beams, at least one of said plurality of cantilever beams having a different length than another of said plurality of cantilever beams.

13. The sensor of claim 8 further comprising a weight disposed on said second end of said sensing beam.

14. The sensor of claim 8 further comprising a diaphragm having a rim, said rim attached to said substrate, said diaphragm disposed generally about said at least one cantilever beam and said electrode, said diaphragm separating said at least one cantilever beam and said electrode from an atmosphere outside said diaphragm and said sensing beam spanning said diaphragm and extending into said atmosphere.

15. The sensor of claim 14 wherein a space between said substrate and said diaphragm is filled with a liquid.

16. The sensor of claim 14 wherein a space between said substrate and said diaphragm is filled with a gas.

17. The sensor of claim 14 wherein a space between said substrate and said diaphragm is evacuated.

18. The sensor of claim 8 wherein said beam is comprised of a material selected from the group consisting of nickel, gold, ruthenium, platinum or combinations thereof.

19. The sensor of claim 8 wherein said electrode is comprised of a material selected from the group consisting of chrome, gold, platinum, rhodium, ruthenium and combinations thereof.

20. The sensor of claim 8 wherein said substrate is comprised of a material selected from the group consisting of glass, silicon or sapphire.

21. The sensor of claim 15 wherein said liquid is selected from the group consisting of silicone oils, organic fluids, and water.

22. The sensor of claim 16 wherein said gas is selected from the group consisting of argon and nitrogen.

* * * * *